(12) United States Patent
Omikawa et al.

(10) Patent No.: US 11,718,294 B2
(45) Date of Patent: Aug. 8, 2023

(54) LANE DEPARTURE PREVENTION CONTROL APPARATUS FOR VEHICLE

(71) Applicant: SUBARU CORPORATION, Tokyo (JP)

(72) Inventors: Takashi Omikawa, Tokyo (JP); Ryo Hajika, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 121 days.

(21) Appl. No.: 16/898,893

(22) Filed: Jun. 11, 2020

(65) Prior Publication Data

US 2021/0061271 A1 Mar. 4, 2021

(30) Foreign Application Priority Data

Aug. 28, 2019 (JP) .............................. JP2019-155894

(51) Int. Cl.
*B60W 30/12* (2020.01)
*B60W 40/072* (2012.01)
(Continued)

(52) U.S. Cl.
CPC ............ *B60W 30/12* (2013.01); *B60W 10/20* (2013.01); *B60W 40/072* (2013.01);
(Continued)

(58) Field of Classification Search
CPC .... B60W 30/12; B60W 10/20; B60W 40/072; B60W 2554/00; B60W 2554/4046; B60W 2710/20; G06K 9/00798
(Continued)

(56) References Cited

U.S. PATENT DOCUMENTS

2005/0267661 A1* 12/2005 Iwazaki ................. B62D 1/286
701/41
2007/0164852 A1* 7/2007 Litkouhi ............... B60W 30/12
348/118
(Continued)

FOREIGN PATENT DOCUMENTS

CN 105936276 * 4/2019
CN 109562786 * 4/2019
(Continued)

OTHER PUBLICATIONS

Yong Zhou, A Lane Departure Warning System Based on Virtual Lane Boundary, 2008, Journal of Information Science and Engineering 24 (Year: 2008).*
(Continued)

*Primary Examiner* — Elaine Gort
*Assistant Examiner* — Matthias S Weisfeld
(74) *Attorney, Agent, or Firm* — McDermott Will & Emery LLP

(57) ABSTRACT

A lane departure prevention control apparatus includes a recognizer that recognizes environment ahead of a vehicle and detects left and right lane markers of a lane where the vehicle is traveling based on the environment, a first detector that detects vehicle behavior, a determiner that predicts whether the vehicle will depart from the lane markers based on the lane markers and the vehicle behavior, a setting unit that sets a range for permitting lane departure prevention control from the lane markers, a calculator that transmits a signal corresponding to steering torque for preventing the vehicle departure from the lane markers to a steering controller when the vehicle departs from the lane markers and the vehicle is within the control permission range, and a second detector that detects a shape change in the lane. The
(Continued)

unit variably sets the control permission range based on the shape change.

11 Claims, 14 Drawing Sheets

(51) Int. Cl.
  *B60W 10/20* (2006.01)
  *G06V 20/56* (2022.01)
(52) U.S. Cl.
  CPC ....... *G06V 20/588* (2022.01); *B60W 2552/53* (2020.02); *B60W 2554/4046* (2020.02); *B60W 2710/20* (2013.01)
(58) Field of Classification Search
  USPC .......................................................... 701/41
  See application file for complete search history.

(56) References Cited

U.S. PATENT DOCUMENTS

| | | | |
|---|---|---|---|
| 2009/0088966 | A1 | 4/2009 | Yokoyama et al. |
| 2009/0265062 | A1* | 10/2009 | Nguyen Van ........ B62D 15/025 |
| | | | 701/42 |
| 2011/0231062 | A1* | 9/2011 | Kim ..................... B62D 15/025 |
| | | | 701/1 |
| 2012/0010808 | A1 | 1/2012 | Yokoyama et al. |
| 2013/0030602 | A1* | 1/2013 | Joeng ................... B60W 30/12 |
| | | | 701/1 |
| 2017/0233004 | A1* | 8/2017 | Hatano ................... B62D 6/002 |
| | | | 701/41 |
| 2018/0037216 | A1* | 2/2018 | Otake ................... B60W 30/12 |
| 2018/0037260 | A1* | 2/2018 | Otake ................... G05D 1/0212 |
| 2018/0170378 | A1* | 6/2018 | Oka ........................ G08G 1/167 |
| 2020/0384992 | A1* | 12/2020 | Eguchi ................... B60W 30/12 |

FOREIGN PATENT DOCUMENTS

| | | |
|---|---|---|
| JP | 11-091606 A | 4/1999 |
| JP | 2009-078733 A | 4/2009 |
| JP | 2013-091494 A | 5/2013 |
| KR | 20170119877 | * 10/2017 |

OTHER PUBLICATIONS

Japanese Notice of Reasons for Refusal issued in corresponding Japanese Patent Application No. 2019-155894, dated Apr. 4, 2023, with English translation.

* cited by examiner

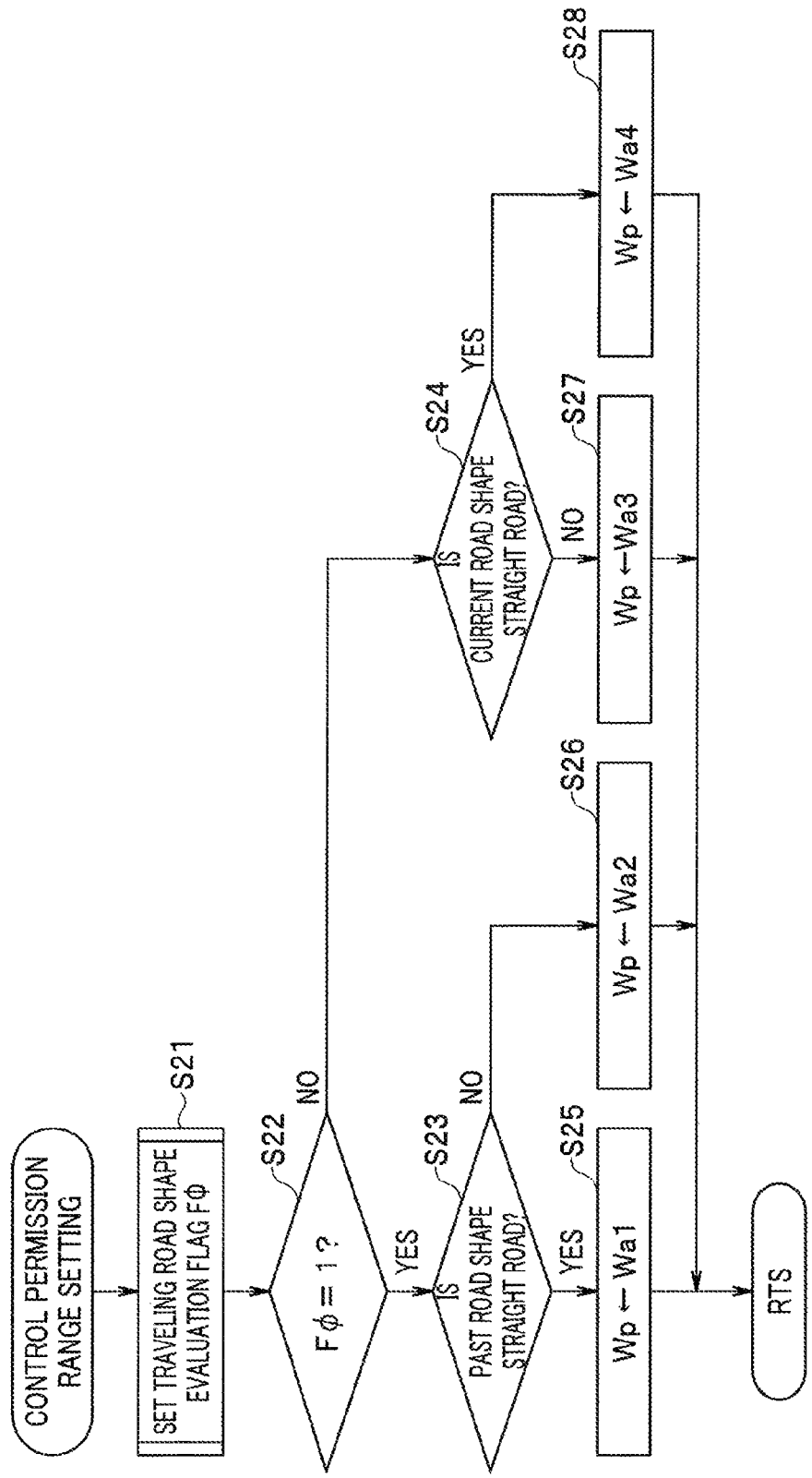

LANE DEPARTURE PREVENTION CONTROL APPARATUS FOR VEHICLE

CROSS-REFERENCE TO RELATED APPLICATIONS

The present application claims priority from Japanese Patent Application No. 2019-155894 filed on Aug. 28, 2019, the entire contents of which are hereby incorporated by reference.

BACKGROUND

The technology relates to a vehicle lane departure prevention control apparatus that starts departure prevention control when an own vehicle tends to depart from a traveling lane and the own vehicle is within a control permission range.

Conventionally, such a lane departure prevention control apparatus first recognizes a traveling lane of an own vehicle using a sensing device such as a camera mounted on the own vehicle. When it is determined that the travel direction of the own vehicle tends to depart from the traveling lane, the lane departure prevention control apparatus controls steering torque and performs steering control so that the travel direction becomes parallel to a lane marker to thereby prevent the own vehicle from departing from the traveling lane.

For example, Japanese Unexamined Patent Application Publication No. 2013-91494 discloses a technique that detects a lateral speed of the own vehicle when it is determined that the own vehicle tends to depart from the traveling lane and sets a steering force that increases by a larger change amount as the departure between a target lateral position in a direction for preventing the departure from the traveling lane and the lateral position of the own vehicle increases. The technique increasingly corrects the steering torque in the direction for preventing the departure from the traveling lane according to an increase in the lateral speed and applies the corrected steering torque to the steering mechanism to thereby avoid lane departure.

SUMMARY

An aspect of the technology provides a lane departure prevention control apparatus for a vehicle. The apparatus includes a traveling environment recognizer, a vehicle behavior detector, a predicted departure determiner, a control permission range setting unit, a steering torque calculator, and a lane shape detector. The traveling environment recognizer is configured to recognize a traveling environment ahead of an own vehicle and detect lane markers that mark left and right sides of a lane in which the own vehicle is traveling based on the recognized traveling environment. The vehicle behavior detector is configured to detect behavior of the own vehicle. The predicted departure determiner is configured to predict whether the own vehicle will depart from the lane markers based on the left and right lane markers detected by the traveling environment recognizer and the behavior of the own vehicle detected by the vehicle behavior detector. The control permission range setting unit is configured to set a control permission range for permitting lane departure prevention control from the lane markers in a lane center direction using the left and right lane markers detected by the traveling environment recognizer as references. The steering torque calculator is configured to transmit a drive signal corresponding to steering torque for preventing departure of the own vehicle from the lane markers to a steering controller when the predicted departure determiner determines that the own vehicle will depart from the lane markers and determines that the own vehicle is within the control permission range set by the control permission range setting unit. The lane shape detector is configured to detect a change in a shape of the lane in which the own vehicle is traveling. The control permission range setting unit variably sets the control permission range based on the change in the shape of the lane detected by the lane shape detector.

An aspect of the technology provides a vehicle lane departure prevention control apparatus. The apparatus includes circuitry. The circuitry is configured to recognize a traveling environment ahead of an own vehicle and detect lane markers that mark left and right sides of a lane in which the own vehicle is traveling based on the recognized traveling environment. The circuitry is configured to detect behavior of the own vehicle. The circuitry is configured to predict whether the own vehicle will depart from the lane markers based on the detected left and right lane markers and the detected behavior of the own vehicle. The circuitry is configured to set a control permission range for permitting lane departure prevention control from the lane markers in a lane center direction using the detected left and right lane markers as references. The circuitry is configured to transmit a drive signal corresponding to steering torque for preventing departure of the own vehicle from the lane marker to a steering controller when it is determined that the own vehicle will depart from the lane markers and it is determined that the own vehicle is within the control permission range. The circuitry is configured to detect a change in a shape of the lane in which the own vehicle is traveling. The circuitry is configured to variably set the control permission range based on the detected change in the shape of the lane.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 6 is a flowchart illustrating a control permission range setting subroutine;

DETAILED DESCRIPTION

When it is detected that the own vehicle tends to depart from a traveling lane, the lane departure prevention control apparatus tries to avoid lane departure by forcible steering intervention and sets a control permission range using lane markers for marking left and right sides of the lane in which the own vehicle is traveling as references at a lateral position to start steering control.

Figure 11:
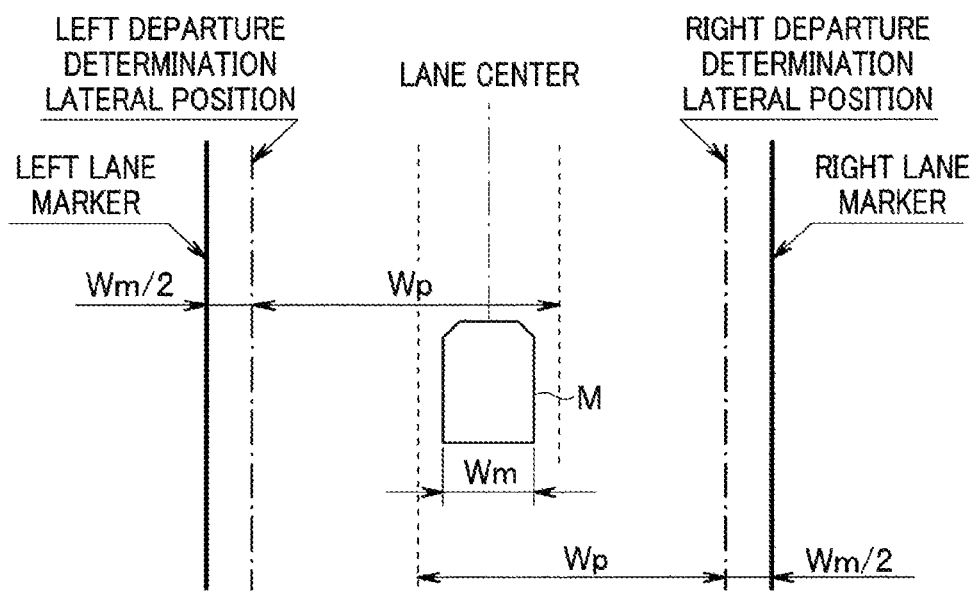
FIG. 11 is an explanatory diagram illustrating a control permission range of lane departure prevention control set on a traveling lane.

That is, as illustrated in FIG. 11, a control permission range Wp is set on left and right sides using positions corresponding to ½ of a vehicle width Wm from the left and right lane markers (lateral positions at which the vehicle body does not protrude from the lane markers) as references and each control permission range Wp is set in a relatively wide range beyond the center of the lane.

This is because when a tendency of lane departure is detected, for example, at an entrance of a curved road where the lane shape changes from a straight road to a curved road, the lane departure prevention control apparatus needs to execute departure prevention control by gradually increasing lateral acceleration (increase of steering quantity) as the vehicle enters the curve in an attempt to keep the own vehicle parallel to the lane markers.

Figure 14A:
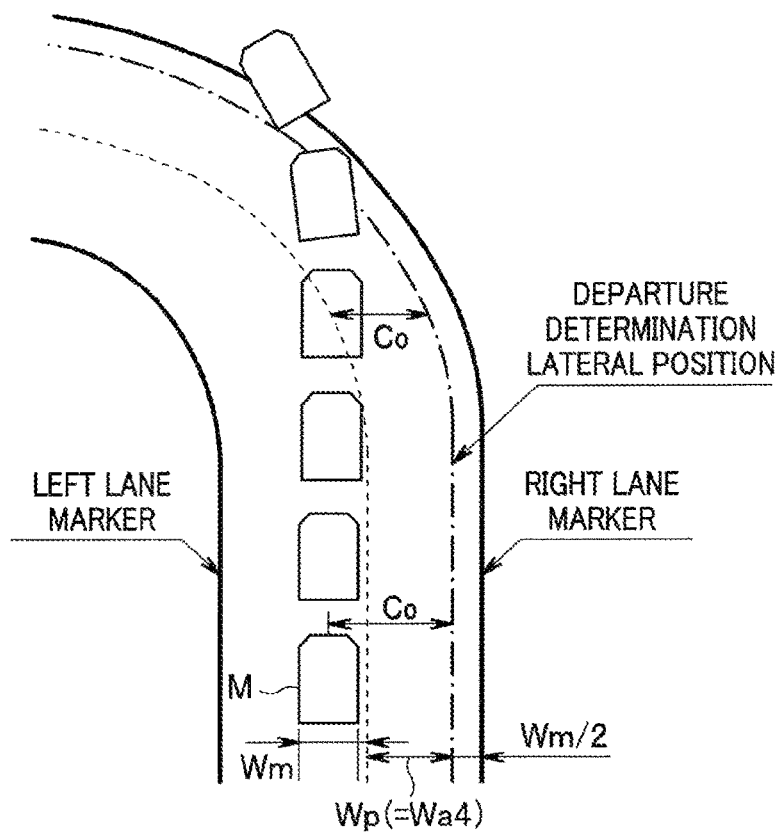
FIG. 14A is an explanatory diagram illustrating behavior of a vehicle when a narrow control permission range is set at a curve entrance.
Figure 14B:
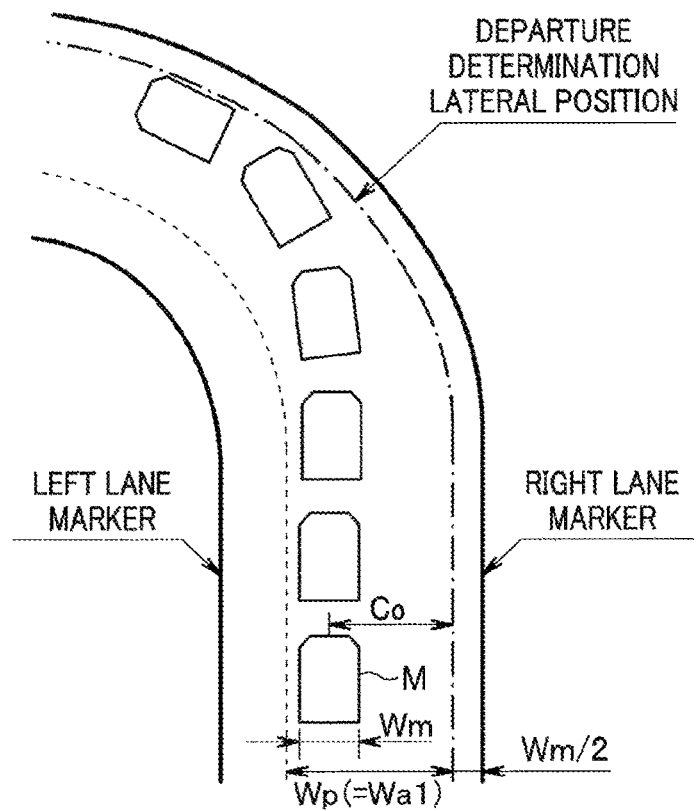
FIG. 14B is an explanatory diagram illustrating behavior of a vehicle when a wide control permission range is set at a curve entrance.

In this case, when the left and right permission ranges Wp are set narrow as illustrated in FIG. 14A, steering intervention by departure prevention control is permitted immediately after the own vehicle M enters a curve, and it is difficult to avoid lane departure. Alternatively, an unreasonable increase of steering may cause excessive jerk (additional acceleration), impairing stability of traveling of the vehicle. Therefore, to guarantee stability of traveling of the vehicle, it is necessary to set the left and right permission ranges Wp wide beyond the center of the lane as illustrated in FIG. 14B and permit the steering intervention in an early stage before entering the curve.

Figure 13A:
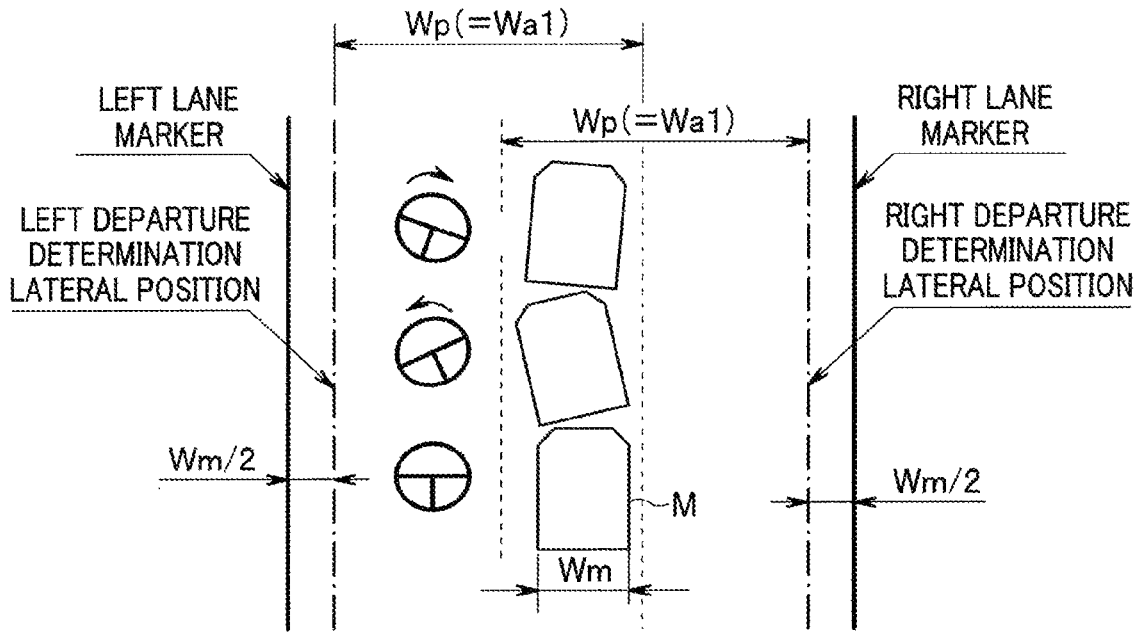
FIG. 13A is an explanatory diagram illustrating behavior of a vehicle when a wide control permission range is set on a straight road.

However, if the left and right permission ranges Wp are set wide beyond the center of the lane, while the own vehicle is traveling near the center of the lane of a straight road, abrupt steering causes a predicted value of lateral acceleration to temporarily increase as illustrated, for example, in FIG. 13A and if a tendency of lane departure is detected, the steering intervention is immediately permitted. As a result, there is inconvenience that traveling stability of the vehicle during straight traveling is impaired.

Considering the aforementioned situations, it is desirable to provide a vehicle lane departure prevention control apparatus capable of starting lane departure prevention control at optimum timing corresponding to a lane shape.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
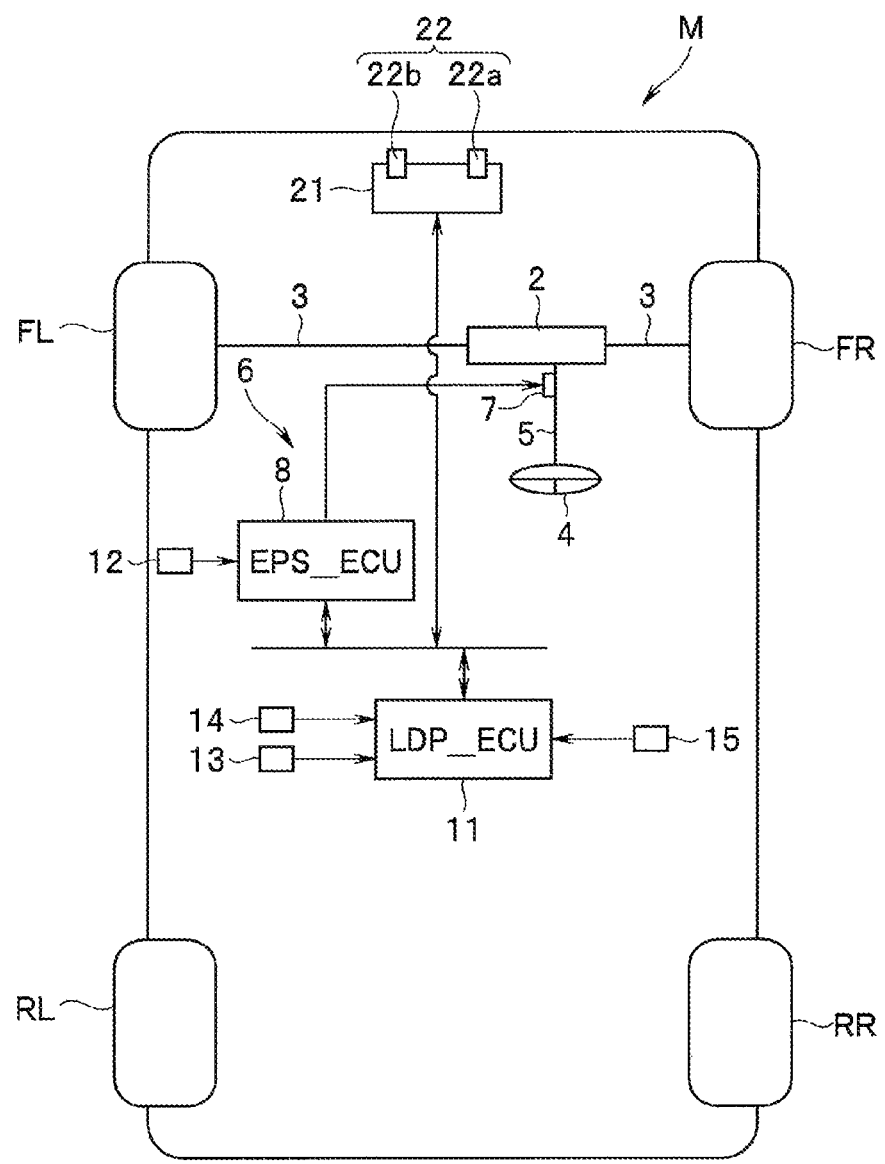
FIG. 1 is a schematic configuration diagram of main parts of a vehicle mounted with a lane departure prevention control apparatus.

In FIG. 1, a vehicle (own vehicle) M is provided with left and right front wheels FL and FR, and left and right rear wheels RL and RR, and the left and right front wheels FL and FR are coupled to a steering mechanism 2 such as a rack and pinion mechanism via a tie-rod 3. A steering shaft 5, to a distal end of which a steering wheel 4 is fixed, is coupled to the steering mechanism 2. When a driver operates the steering wheel 4, the front wheels FL and FR are steered via the steering mechanism 2.

An EPS motor 7 of an Electric Power Steering (EPS) apparatus 6 is coupled to the steering shaft 5 via a transmission mechanism (not illustrated). The EPS apparatus 6 includes the EPS motor 7 and an EPS control unit (EPS_ECU) 8 as a steering controller, and the EPS_ECU 8 controls steering torque applied to the steering shaft 5 by the EPS motor 7.

That is, a steering torque sensor 12 that detects the steering torque applied to the steering wheel 4 attached to the steering shaft 5 is coupled to the EPS_ECU 8 to set torque (assist torque) assisting the steering torque applied by the driver to the steering wheel 4 according to the detected steering torque and a vehicle speed or the like detected by a vehicle speed sensor 13, which will be described later. Applying the assist torque to the steering shaft 5 alleviates the burden on the driver for operating the steering wheel.

The EPS_ECU 8 is coupled to an Lane Departure Prevention (LDP) ECU 11 via an in-vehicle network using Controller Area Network (CAN) communication or the like.

In the lane departure prevention control, a command signal corresponding to the steering torque set by the LDP_ECU 11 is transmitted to the EPS_ECU 8, and the EPS_ECU 8 generates predetermined assist torque in the EPS motor 7 to perform control so that the own vehicle M returns to the central direction of the lane and prevent departure from the lane markers. Note that departure of the own vehicle M from the lane markers will be described hereinafter as "lane departure" for the sake of convenience.

Although not illustrated, units for controlling vehicle traveling states such as an engine control unit, a transmission control unit, a brake control unit are coupled to the in-vehicle network in addition to the EPS_ECU 8 and the LDP_ECU 11, in a mutually communicable manner.

Sensors as vehicle behavior detectors for detecting behavior of the own vehicle M such as the vehicle speed sensor 13 that detects a vehicle speed, a yaw rate sensor 14 as a yaw rate detector that detects a yaw rate and lateral acceleration generated in the vehicle body, a steering angle sensor 15 as a steering angle detector that detects a steering angle from the angle of rotation of the steering shaft 5 are coupled to the LDP_ECU 11. Note that the steering torque detected by the steering torque sensor 12 and the vehicle speed detected by the vehicle speed sensor 13 are also transmitted to a lane recognizer 24, which will be described later.

Figure 2:
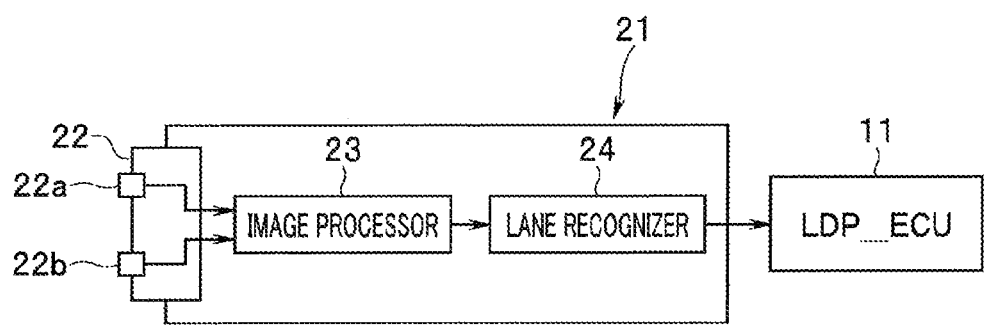
FIG. 2 is a functional block diagram of a camera unit.

On the other hand, reference numeral 21 denotes a camera unit as a traveling environment recognizer, and the camera unit incorporates a vehicle-mounted camera 22 constructed of a stereo camera including a main camera 22a and a subcamera 22b, an image processor 23 and a lane recognizer 24 as illustrated in FIG. 2. Both cameras 22a and 22b are disposed, for example, above a room mirror at the front in the vehicle, horizontally at equal intervals left and right from the center in the vehicle width direction near the windshield. The respective cameras 22a and 22b are provided with color image pickup devices such as color cameras equipped with a color CCD or a color CMOS, and both color image pickup devices photograph three-dimensional color images in the traveling environment ahead in the travel direction such as the lane in which the own vehicle M is traveling (traveling lane) and the left and right lane markers for marking the traveling lane.

The image processor 23 converts a pair of analog images photographed by the respective cameras 22a and 22b to digital images with predetermined brightness gradation, generates reference image data from an output signal of the main camera 22a, and generates comparison image data from an output signal of the subcamera 22b. The image processor 23 calculates distance data of an identical object in both images (distance from the own vehicle to the object) based on a parallax between the reference image data and the comparison image data.

The lane recognizer 24 includes a microcomputer and sets lane markers for marking left and right sides of the traveling lane recognized by a technique such as pattern matching on a virtual road plane generated based on the reference image data and the comparison image data transmitted from the image processor 23, and detects a distance (lane width) between inside edges of the left and right lane markers based on the distance data. The lane recognizer 24 transmits the data to the LDP_ECU 11 as lane recognition information.

Figure 3:
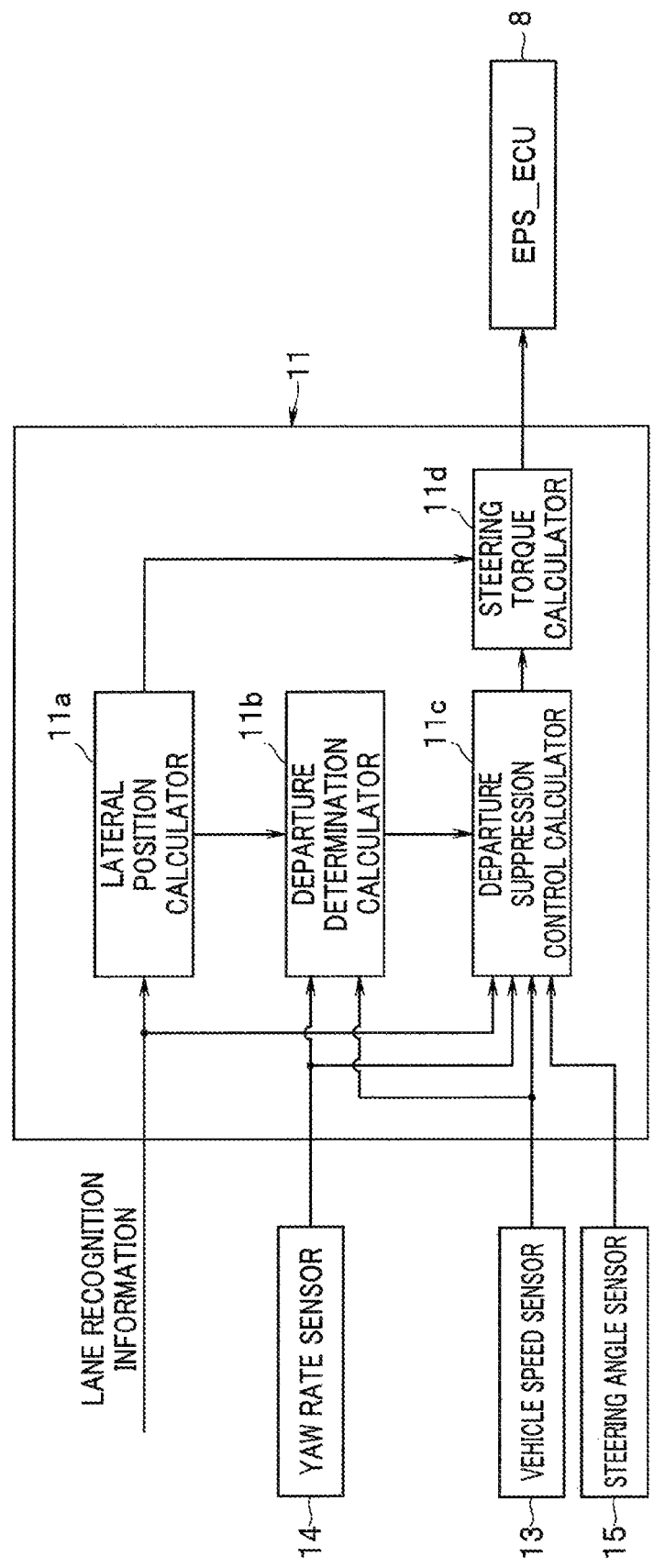
FIG. 3 is a functional block diagram of a lane departure prevention control unit.

As illustrated in FIG. 3, the LDP_ECU 11 is provided with a lateral position calculator 11a, a departure determination calculator 11b, a departure prevention control calculator 11c and a steering torque calculator 11d to control lane departure prevention.

The lateral position calculator 11a calculates lateral positions from inside edges of the left and right lane markers to the center in the vehicle width Wm direction of the own vehicle M based on lane recognition information transmitted from the lane recognizer 24. Alternatively, the lateral position calculator 11a may calculate the lateral positions using the center between the inside edges of both lane markers as a reference.

The departure determination calculator 11b calculates a predicted lateral moving amount from the lateral position of the own vehicle in the traveling lane based on a basic control pattern selected during lane departure prevention control and examines whether the predicted lateral moving amount crosses the departure determination lateral position set inside the lane markers. Note that in the present embodiment, the departure determination lateral position is set at positions inside the inside edges of the lane markers by ½ of the vehicle width Wm as illustrated in FIG. 11. The lateral positions of the own vehicle M with respect to the departure determination lateral positions are based on the center in the vehicle width Wm direction. Therefore, when the travel path of the own vehicle M crosses the departure determination lateral positions, the vehicle body of the own vehicle M will depart from the lane markers.

When the departure determination calculator 11b determines that the own vehicle M will not depart from the lane (between lane markers), the departure determination calculator 11b transmits a steering angle signal for maintaining the current travel path of the own vehicle to the steering torque calculator 11d. On the other hand, when the departure determination calculator 11b predicts that the own vehicle M may depart from the lane, the departure prevention control calculator 11c corrects the predicted lateral moving amount and calculates a new predicted lateral moving amount to avoid lane departure of the own vehicle M for each predetermined calculation cycle. The departure prevention control calculator 11c transmits a steering angle signal corresponding to the predicted lateral moving amount to the steering torque calculator 11d.

The steering torque calculator 11d sets steering torque (control amount) corresponding to the steering angle based on the steering angle signal from the departure determination calculator 11b or the departure prevention control calculator 11c and transmits the steering torque to the EPS_ECU 8. The EPS_ECU 8 drives the EPS motor 7 based on the steering torque transmitted from the LDP_ECU 11 and generates predetermined assist torque. In that case, when the steering torque calculator 11d receives a steering angle signal from the departure prevention control calculator 11c, the EPS_ECU 8 causes the own vehicle M to travel along a predicted travel path (see FIG. 9) set based on the steering angle signal and the vehicle speed so as to avoid departure from the lane markers.

Figure 4:
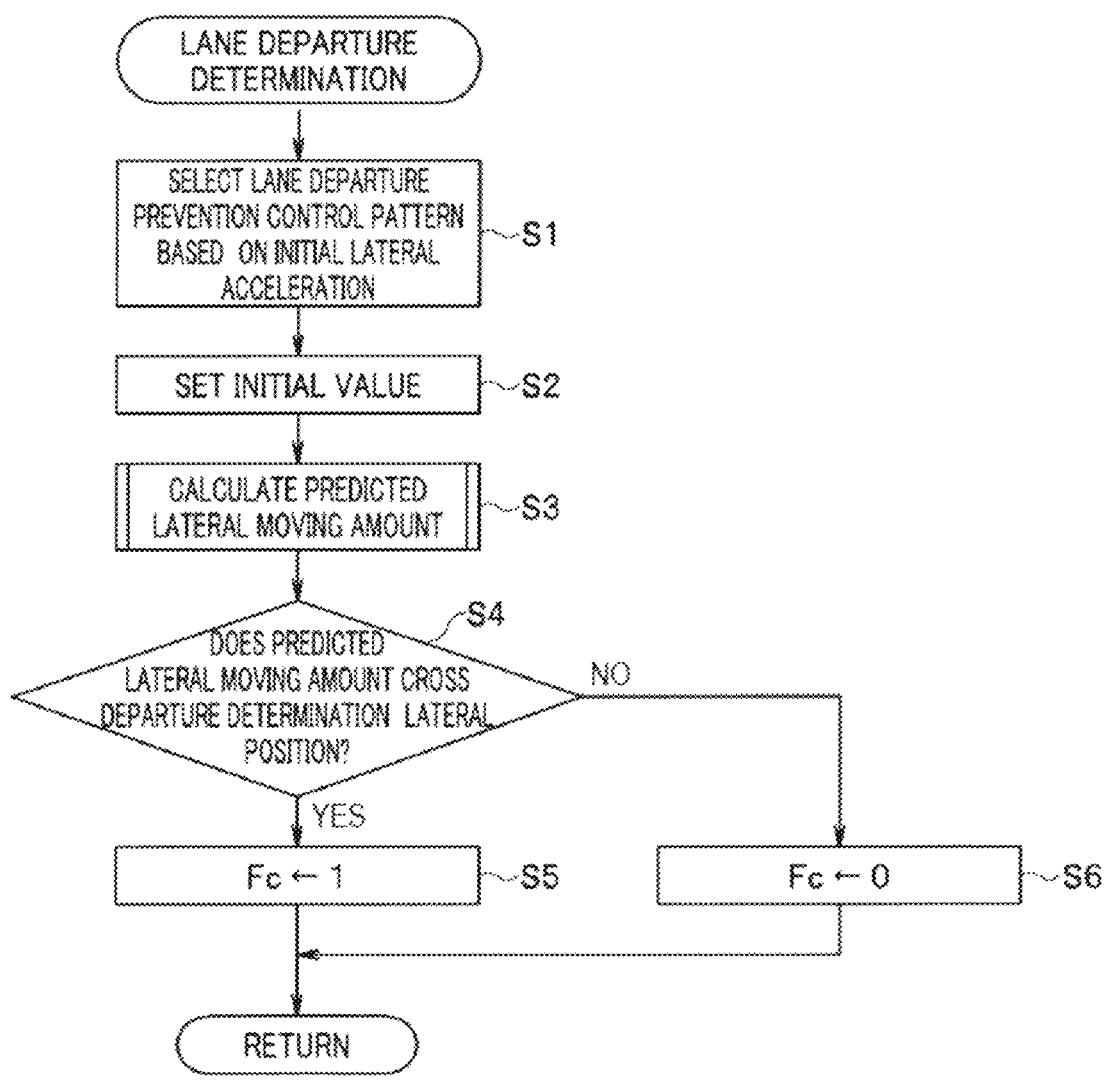
FIG. 4 is a flowchart illustrating a lane departure determination routine.

The lane departure determination by the aforementioned departure determination calculator 11b is processed, for example, according to a lane departure determination routine illustrated in FIG. 4. In one embodiment, the process in this routine may correspond to a "predicted departure determiner".

Figure 10:
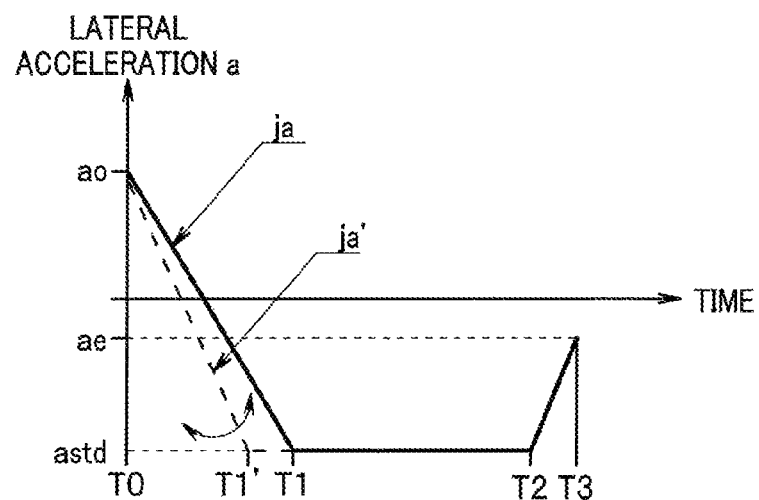
FIG. 10 is a time chart illustrating a lane departure prevention control pattern based on lateral acceleration.

In this routine, a basic control pattern for preventing lane departure is selected in step S1 first. The LDP_ECU 11 includes a plurality of control patterns for setting a traveling locus for lane departure prevention. FIG. 10 illustrates a basic control pattern set based on lateral acceleration using a solid line as an example of the control pattern. Here, "ao" is initial lateral acceleration when the aforementioned departure determination calculator 11b predicts that the vehicle may depart from the lane, "astd" is control standard lateral acceleration whereby the vehicle is turned with lateral acceleration set to a constant value (lateral acceleration≠0) and "ae" is lateral acceleration when the lane departure prevention control is ended.

Figure 9:
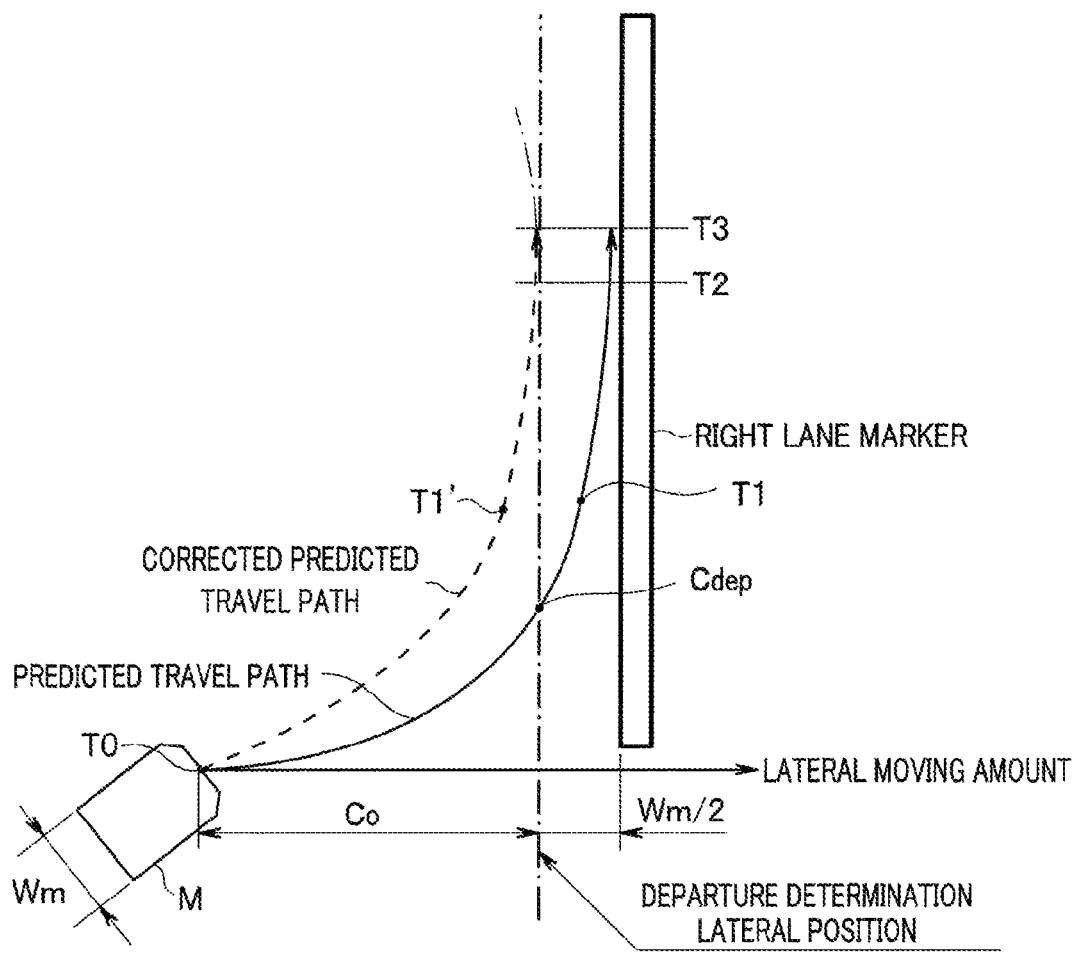
FIG. 9 is an explanatory diagram illustrating a predicted travel path by lane departure prevention control.

The control of lateral acceleration according to the control pattern will be described briefly by applying the control to a predicted travel path illustrated in FIG. 9. Note that a control start lateral position Co of the own vehicle M is assumed to be within a control permission range, which will be described later.

First, when the departure determination calculator 11b predicts that lane departure is likely to occur, lane departure prevention control starts (elapsed time T0), initial lateral acceleration is increased by increasing the steering to the control standard lateral acceleration astd by jerk (additional acceleration) at the time of starting control, set in advance.

When the acceleration reaches the control standard lateral acceleration astd (elapsed time T1), the steering wheel is turned while keeping the steering angle constant (elapsed time T1 to T2). After that, steering is turned back by predetermined turning back jerk in front of the lane marker to make the own vehicle M parallel to the lane marker (elapsed time T3). This makes it possible to avoid lane departure of the own vehicle M.

The aforementioned control pattern for preventing lane departure is a basic pattern, and in step S2, initial values are set for applying the selected control pattern to actual lane departure prevention control. The initial values include a control start lateral position Co (see FIG. 14A and FIG. 14B) from the departure determination lateral position set inside the left and right lane markers to the center of the own vehicle M in the vehicle width Wm direction, a lane curvature, a departure prediction position Cdep (see FIG. 9), which are calculated based on the traveling environment ahead detected by the camera unit 21. Furthermore, a steering increase time jerk (steering increase jerk) ja, a turning back time jerk (turning back jerk) jd, the initial lateral acceleration ao, the end-time lateral acceleration ae and the like are set as the initial values based on various parameters for detecting behavior of the own vehicle M detected by the vehicle speed sensor 13 and the yaw rate sensor 14 and the like.

Note that the initial lateral acceleration ao is calculated by multiplying the yaw rate detected at the yaw rate sensor 14 by the vehicle speed detected at the vehicle speed sensor 13. Alternatively, lateral acceleration corresponding to a current steering angle may be predicted and set based on a vehicle model for which lateral acceleration is measured when the steering wheel is turned as a regular circle while keeping the steering angle constant.

The flow proceeds to step S3 where a predicted lateral moving amount is calculated based on the control pattern selected in step S1 and the initial values set in step S2 for each calculation cycle along with lateral movement of the own vehicle M. Note that the final predicted lateral moving amount is as indicated in equation (1):

Predicted lateral moving amount=steering increase time lateral moving amount+lateral moving amount during control standard lateral acceleration control+turning back time lateral moving amount     (1)

Here, the steering increase time lateral moving amount is a lateral moving amount when increasing the steering in the lane returning direction, the lateral moving amount during control standard lateral acceleration control is a lateral moving amount while keeping steering constant, and the turning back time lateral moving amount is a lateral moving amount for turning back steering until the vehicle M becomes parallel to the lane markers. Therefore, with the lateral moving amount during turning back, the own vehicle M is located at a lateral position closest to the lane marker.

Next, the flow proceeds to step S4 where a locus of the predicted lateral moving amount (predicted travel path) is compared with the aforementioned departure determination lateral position and whether the locus of the predicted lateral moving amount crosses the departure determination lateral position is examined. As indicated by a solid line in FIG. 9, when it is predicted that the locus of the predicted lateral moving amount crosses the departure determination lateral position, the flow proceeds to step S5 where the departure prevention control flag Fc is set (Fc←1), and the routine exits. When it is predicted that the locus of the predicted lateral moving amount passes through the inside without crossing the departure determination lateral position, the flow branches to step S6 where the departure prevention control flag Fc is cleared (Fc←0) and the routine exits.

The value of the departure prevention control flag Fc is read by the departure prevention control calculator 11c. The lane departure prevention control by the departure prevention control calculator 11c is executed more, for example, according to the flowchart illustrated in FIG. 5.

Figure 5:
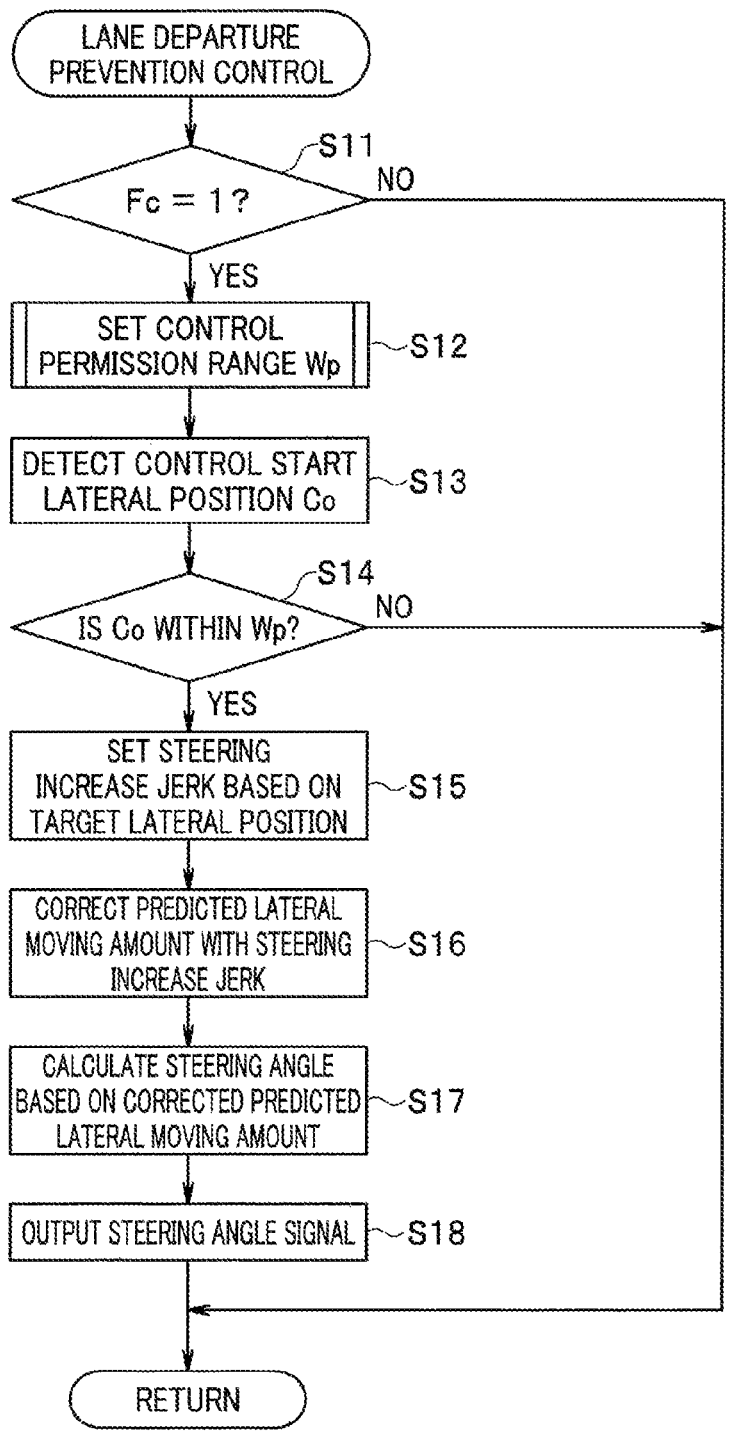
FIG. 5 is a flowchart illustrating a lane departure prevention control routine.

In the lane departure prevention control routine illustrated in FIG. 5, the value of the departure prevention control flag Fc is examined in step S11. When Fc=1, it is determined that the locus of the predicted lateral moving amount set according to the control pattern crosses the departure determination lateral position and the flow proceeds to step S12. When Fc=0, it is determined that the locus of the predicted lateral moving amount is within the departure determination lateral position and the routine exits.

When the flow proceeds to step S12, the control permission range Wp is set. In step S12, a control permission range setting subroutine illustrated in FIG. 6 is executed and the control permission range Wp is set. In one embodiment, the process in this subroutine may correspond to a "control permission range setting unit".

In this subroutine, a lane shape evaluation flag Fφ is set in step S21 first. In step S21, a lane shape evaluation flag setting subroutine illustrated in any one of FIG. 7A, FIG. 7B, FIG. 8A and FIG. 8B is executed, a change in the shape of the lane (lane curvature) in which the own vehicle M is traveling is detected and the lane shape evaluation flag Fφ is set.

That is, when the lane curvature changes gradually increasingly, the lane shape evaluation flag Fφ is set (Fφ←1) and when the lane curvature changes gradually decreasingly, the lane shape evaluation flag Fφ is cleared (Fφ←0). Note that, hereinafter, (n) denotes a currently calculated value and (n−1) denotes a previously calculated value. In one embodiment, the processes in the flowchart illustrated in FIG. 7A, FIG. 7B, FIG. 8A and FIG. 8B may correspond to a "lane shape detector".

(a) Setting Lane Shape Evaluation Flag Fφ Based on Curve Curvature

Figure 7A:
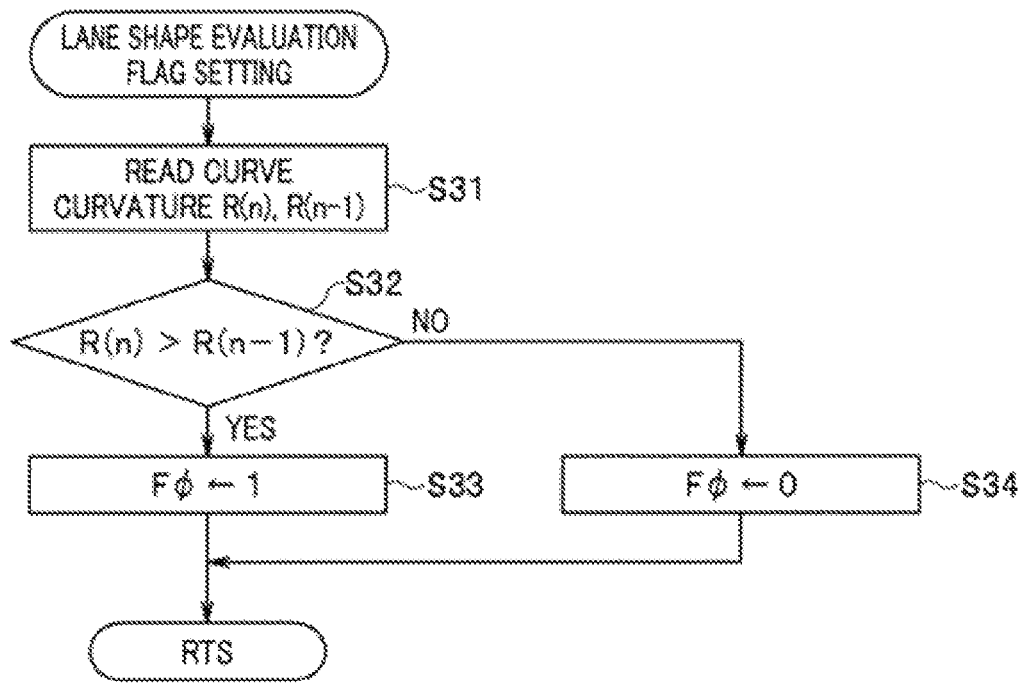
FIG. 7A is a flowchart illustrating a lane shape evaluation flag setting subroutine based on a lane curvature.

In the subroutine illustrated in FIG. 7A, curve curvatures R(n) and R(n−1) at the center between the lane markers marking left and right sides calculated for each calculation cycle are read based on the traveling environment ahead detected by the camera unit 21 in step S31 first. In step S32, a change in the lane curvature is detected from the curve curvatures R(n) and R(n−1).

That is, when R(n)>R(n−1), it is determined that a change occurs in a direction in which the lane curvature increases, and the flow proceeds to step S33 where the lane shape evaluation flag Fφ is set (Fφ←1), and the flow proceeds to step S22 in FIG. 6.

On the other hand, when R(n)≤R(n−1), it is determined that a change occurs in a direction in which the lane curvature decreases or the lane curvature is constant (no change), and the flow branches to step S34 where the lane shape evaluation flag Fφ is cleared (Fφ←0), and the flow proceeds to step S22 in FIG. 6.

Note that in this case, when the curve curvature recognized by the camera unit 21 is three-dimensionally approximated, the current curve curvature R(n) may be compared with the curve curvature R(n+1) ahead to detect a change in the lane curvature.

(b) Setting Lane Shape Evaluation Flag Fφ Based on Steering Angle

Figure 7B:
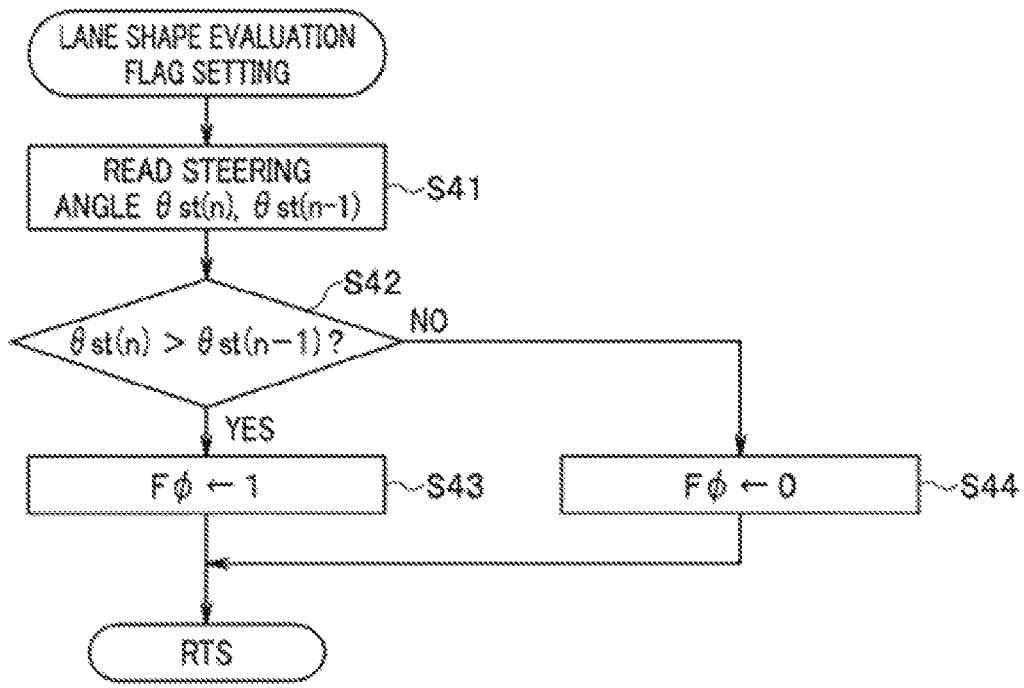
FIG. 7B is a flowchart illustrating a lane shape evaluation flag setting subroutine based on a steering angle.

In the subroutine illustrated in FIG. 7B, steering angles θst(n) and θst(n−1) for detecting behavior in the lateral direction acting on the own vehicle M detected by the steering angle sensor 15 are read in step S41 first.

In step S42, a change in the road shape is detected from a turning situation of the own vehicle M based on the steering angles θst(n) and θst(n−1).

That is, when θst(n)>θst(n−1), it is determined that a change occurs in the direction in which the lane curvature increases and the flow proceeds to step S43 where the lane shape evaluation flag Fφ is set (Fφ←1), and the flow proceeds to step S22 in FIG. 6.

On the other hand, when θst(n)≤θst(n−1), it is determined that a change occurs in the direction in which the lane curvature decreases or that the lane curvature is constant (no change), and the flow branches to step S44 to clear the lane shape evaluation flag Fφ (Fφ←0), and the flow proceeds to step S22 in FIG. 6.

(c) Setting Lane Shape Evaluation Flag Fφ Based on Yaw Rate

Figure 8A:
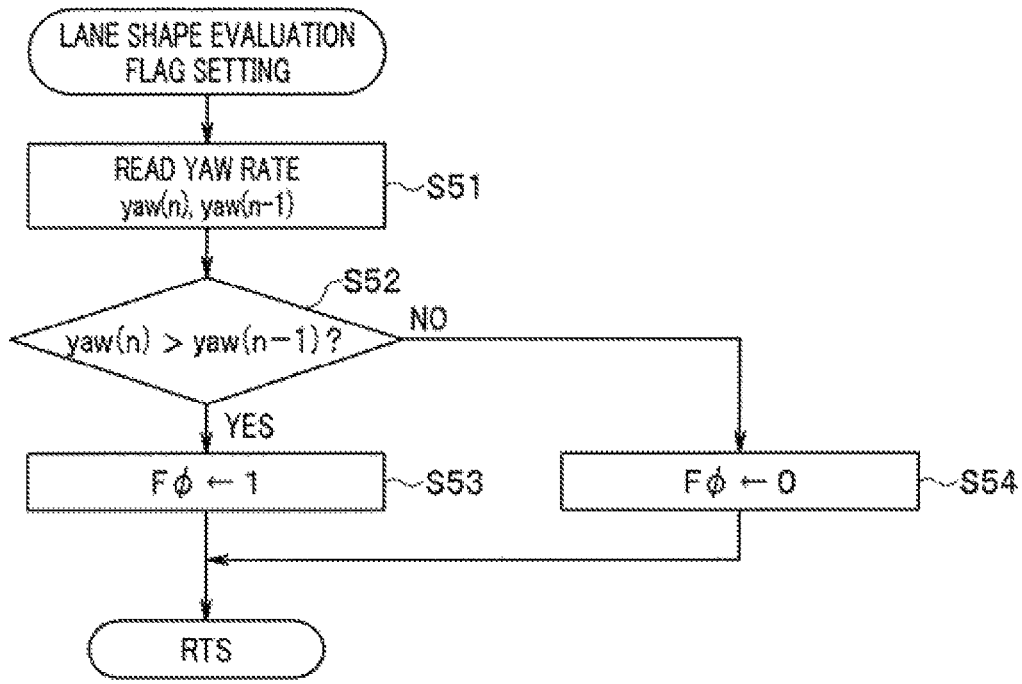
FIG. 8A is a flowchart illustrating a lane shape evaluation flag setting subroutine based on a yaw rate.

In the subroutine illustrated in FIG. 8A, yaw rates yaw(n) and yaw(n−1) for detecting behavior in the lateral direction acting on the own vehicle M detected by the yaw rate sensor 14 are read in step S51 first. In step S52, a change in the road shape is detected from the turning situation of the own vehicle M according to the yaw rates yaw(n) and yaw(n−1).

That is, when yaw(n)>yaw(n−1), it is determined that a change occurs in a direction in which the lane curvature increases, and the flow proceeds to step S53 where the lane shape evaluation flag Fφ is set (Fφ−1), and the flow proceeds to step S22 in FIG. 6.

On the other hand, when yaw(n)≤yaw(n−1), it is determined that a change occurs in a direction in which the lane curvature decreases or the lane curvature is constant (no change), and the flow branches to step S54 where the lane shape evaluation flag Fφ is cleared (Fφ←0), and the flow proceeds to step S22 in FIG. 6.

(d) Setting Lane Shape Evaluation Flag Fφ Based on Lateral Acceleration

Figure 8B:
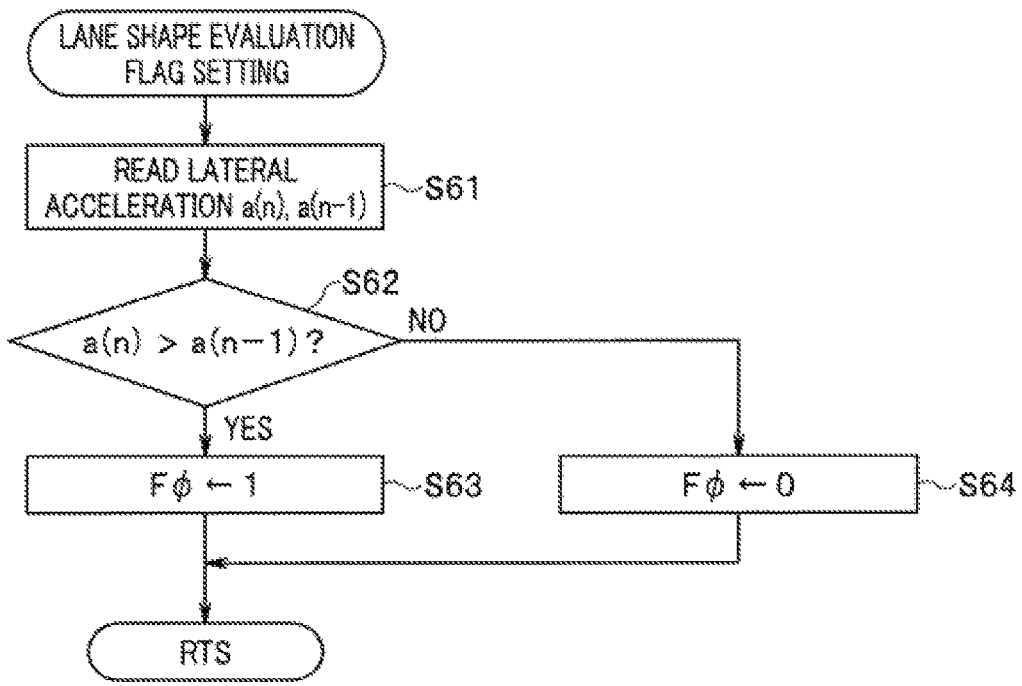
FIG. 8B is a flowchart illustrating a lane shape evaluation flag setting subroutine based on lateral acceleration.

In the subroutine illustrated in FIG. 8B, lateral accelerations a(n) and a(n−1) calculated based on the yaw rates yaw(n) and yaw(n−1) for detecting behavior in the lateral direction acting on the own vehicle M detected by the yaw rate sensor 14 are read in step S61 first. In step S62, a change in the road shape is detected from the turning situation of the own vehicle M according to the lateral accelerations a(n) and a(n−1).

Therefore, the yaw rate sensor works also as a lateral acceleration detector. Note that the lateral accelerations a(n) and a(n−1) may be directly detected by a lateral acceleration sensor, which is the lateral acceleration detector.

That is, when a(n)>a(n−1), it is determined that a change occurs in a direction in which the lane curvature increases, and the flow proceeds to step S63 where the lane shape evaluation flag Fφ is set (Fφ←1), and the flow proceeds to step S22 in FIG. 6.

On the other hand, when a(n)≤a(n−1), it is determined that a change occurs in a direction in which the lane curvature decreases or the lane curvature is constant (no change), and the flow branches to step S64 where the lane shape evaluation flag Fφ is cleared (Fφ←0), and the flow proceeds to step S22 in FIG. 6.

Aforementioned (a) to (d) are merely an example where a change in the road shape is detected, but the road shape need not be determined with instantaneous absolute values, for example, each parameter may be filter-processed to stabilize shape determination. Furthermore, all or two or more of aforementioned (a) to (d) may be selected and executed, and the respective values may be evaluated and a lane shape evaluation flag Fφ value having a higher degree of coincidence may be set as the final lane shape evaluation flag Fφ value.

When the flow proceeds to step S22 in FIG. 6, a control permission range Wp corresponding to the shape of the road on which the vehicle is traveling is set in step S22 and subsequent steps. The control permission range Wp is intended to determine a lateral position to permit intervention of lane departure prevention control and the lane departure prevention control is permitted when the own vehicle M is traveling within the control permission range Wp. On the other hand, when the own vehicle M is out of the control permission range Wp, the lane departure prevention control is not permitted.

Figure 12:
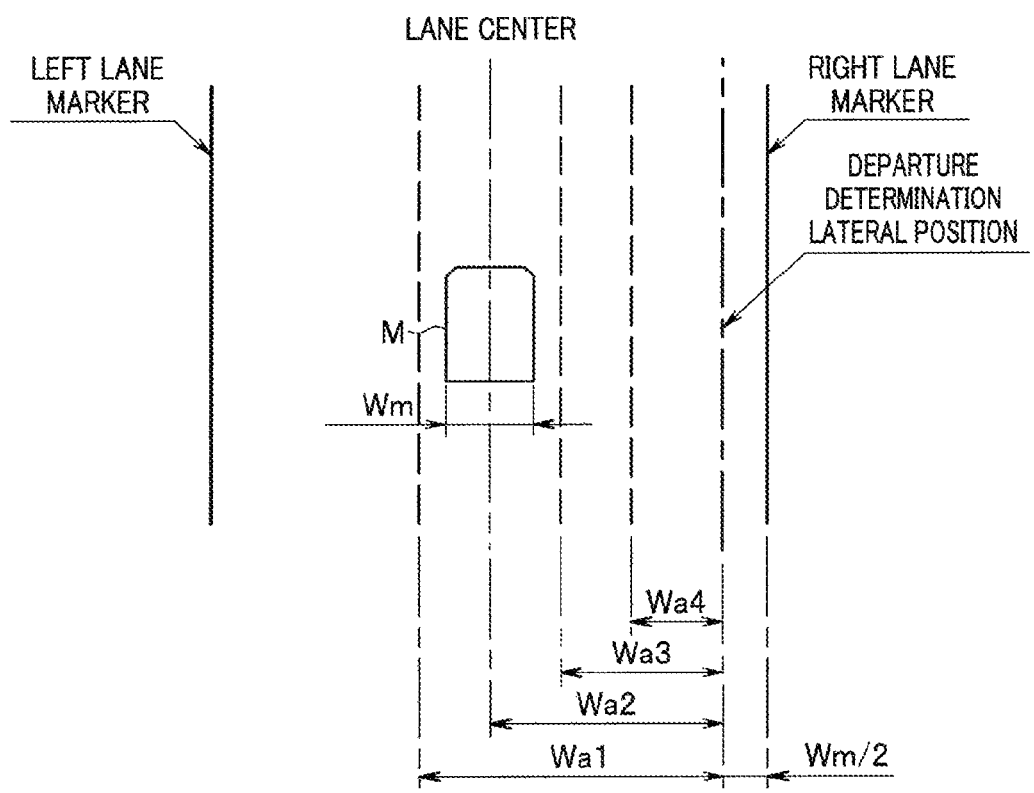
FIG. 12 is an explanatory diagram illustrating a setting width of the control permission range.

As illustrated in FIG. 11, the control permission range Wp is set on the left and right sides using the departure determination lateral positions as references. Furthermore, as illustrated in FIG. 12, the control permission range Wp is set by any one of first to fourth permission ranges Wa1 to Wa4 depending on the shape of the road on which the own vehicle M is traveling. Note that although FIG. 12 illustrates only the first to fourth permission ranges Wa1 to Wa4 on the right side for the sake of convenience, the first to fourth permission ranges Wa1 to Wa4 are also set on the left side.

FIG. 11 illustrates a state in which the control permission range Wp is set to the first permission range Wa1 where a widest lateral position is secured. As illustrated in FIG. 13A, when the control permission range Wp is set to the first permission range Wa1, the left and right control permission ranges Wp overlap at the center of the lane, and the control permission ranges Wp are set such that the vehicle width Wm of the own vehicle M falls within the overlapping area. Note that conventionally, the first permission range Wa1 has been uniformly set as the control permission range Wp.

Figure 13B:
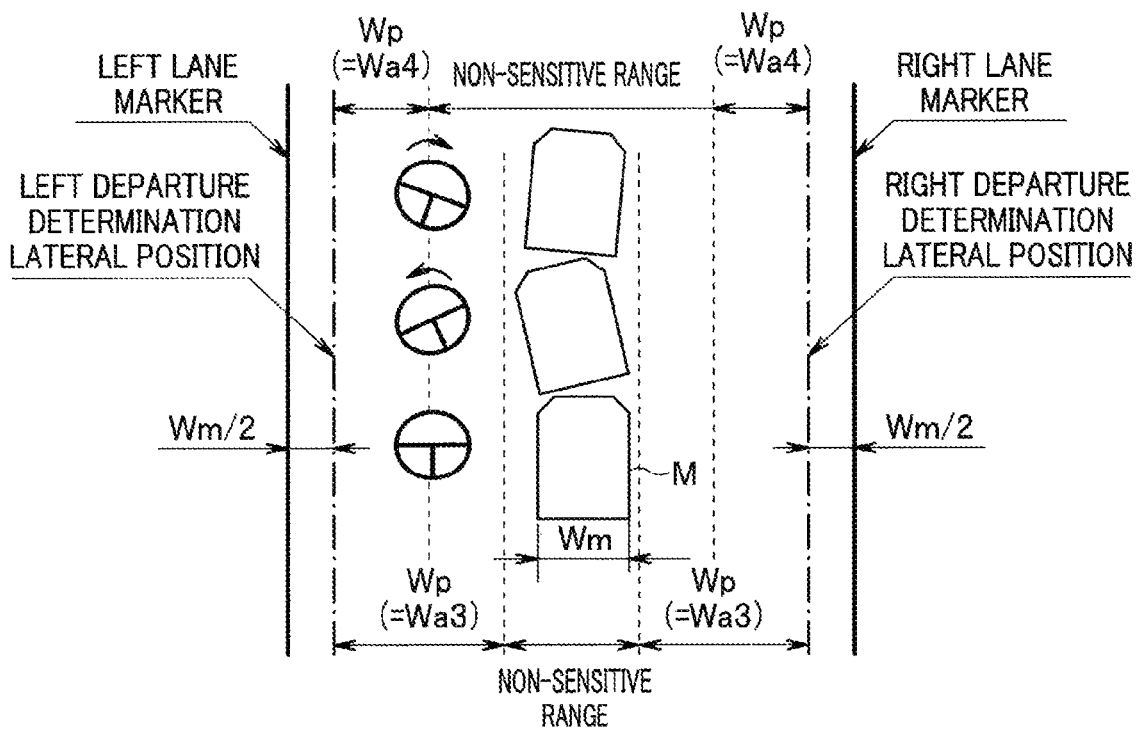
FIG. 13B is an explanatory diagram illustrating behavior of a vehicle when a narrow control permission range is set on a straight road.

In the present embodiment, the second permission range Wa2 is set within a range from the departure determination lateral position to the center of the lane and the third permission range Wa3 is set within a range (lateral width) in which the third permission range Wa3 does not overlap the vehicle width Wm when the own vehicle M is traveling at the center of the lane. Furthermore, the fourth permission range Wa4 is set within a narrow range (lateral width) biased to the departure determination lateral position side compared with the third permission range Wa3. Therefore, as illustrated in FIG. 13B, a non-sensitive range where no departure prevention control is permitted is set between the third permission range Wa3 and the fourth permission range Wa4 set inside the left and right sides of the lane.

In step S22, the value of the lane shape evaluation flag Fφ set in step S21 is referred to, and when Fφ=1, the flow proceeds to step S23. When Fφ=0, the flow jumps to step S24.

When it is determined that Fφ=1, that is, that a change occurs in a direction in which the lane curvature increases and the flow proceeds to step S23, the road shape in the past (at the time of previous calculation in the present embodiment) is examined from the past history of any of parameters for detecting a change in the road shape such as the curve curvature R at the center of the lane recognized by the camera unit 21, the steering angle Est detected by the steering angle sensor 15, the yaw rate yaw detected by the yaw rate sensor 14, or lateral acceleration a.

When the past road shape is a straight road, it is determined that the own vehicle M is entering a curve entrance, the flow proceeds to step S25, the control permission range Wp is set to the first permission range Wa1 (Wp←Wa1), and the flow proceeds to step S13 in FIG. 5. When the past road shape is a curved road, it is determined that the own vehicle M is proceeding a sharply curved road from a gently curved road, and the flow branches to step S26 where the control permission range Wp is set to the second permission range Wa2 (Wp←Wa2) and the flow proceeds to step S13 in FIG. 5.

On the other hand, when Fϕ=0 in step S22, that is, it is determined that a change occurs in a direction in which the lane curvature decreases or that there is no change, the flow branches to step S24, and the current road shape is examined based on any of the parameters indicating a change in the aforementioned road shape.

When the current road shape is a curved road, it is determined that the own vehicle M is traveling from a sharply curved road to a gently curved road or traveling on the curved road whose lane curvature is constant, and the flow proceeds to step S27. In step S27, the control permission range Wp is set to the third permission range Wa3 (Wp←Wa3), and the flow proceeds to step S13 in FIG. 5. When the current road shape is a straight road, it is determined that the own vehicle M is traveling toward the exit of the curved road or that the own vehicle M is traveling the straight road continuously, the flow branches to step S28, the control permission range Wp is set to the fourth permission range Wa4 (Wp←Wa4), and the flow proceeds to step S13 in FIG. 5.

When the flow proceeds to step S13 in FIG. 5, the control start lateral position Co is detected. As illustrated in FIG. 14A and FIG. 14B, this control start lateral position Co is a distance from the center of the vehicle width Wm of the own vehicle M to the departure determination lateral position set right beside. When this lateral position is determined based on the traveling environment ahead detected by the camera unit 21, the lateral position is detected from the traveling environment at the position where the own vehicle M actually passes with reference to the history of traveling environments in the past.

Next, the flow proceeds to step S14 to examine whether the control start lateral position Co of the own vehicle M is within the control permission range Wp. When the control start lateral position Co of the own vehicle M is within the control permission range Wp, the flow proceeds to step S15. When the control start lateral position Co of the own vehicle M is within the aforementioned non-sensitive range, the routine is exited as is.

Even when the own vehicle M is driven by the driver's steering wheel operation or the own vehicle M is driven by lane maintaining (ALK: Active Lane Keep) control, the steering wheel may be taken due to irregularities of the road surface or the like producing a yaw moment in the own vehicle M. The aforementioned predicted lateral moving amount is always calculated for each predetermined calculation cycle, and if such a yaw moment is generated, the locus of the predicted lateral moving amount may cross the departure determination lateral position depending on the behavior of the own vehicle M at that time, causing an erroneous determination as lane departure.

In such situation, since the first control range Wa1 has been set uniformly as the control permission range Wp conventionally as illustrated in FIG. 13A, intervention of the lane departure prevention control is permitted, turning back of steering and steering increase are alternated, and driving stability is likely to be impaired.

By contrast, in the present embodiment, during traveling on a straight road, since the control permission range Wp is set to the fourth control range Wa4 having a narrow permission range in step S28, the own vehicle M is traveling in a non-sensitive range as illustrated in FIG. 13B, even when lane departure is determined, intervention of the lane departure prevention control is not permitted, and it is thereby possible to obtain stable traveling performance.

On the other hand, at a curve entrance where the straight road is led to the curved road, the control permission range Wp is set to the fourth control range Wa4 on the straight road as described above, if the control permission range Wp (=Wa4) is continuous to the curve entrance, since the permission range set in the control permission range Wp is narrow as illustrated in FIG. 14A, the vehicle has already passed through the curve entrance at a time point at which the lane departure prevention control is permitted, it is difficult to avoid lane departure even if steering control is executed to avoid departure. An attempt to forcefully avoid the lane departure may increase a steering increase jerk due to sudden braking or sudden steering, which may impair traveling stability.

By contrast, in the present embodiment, when the own vehicle M enters the curve entrance from a straight road as illustrated in FIG. 14B, the lane curvature gradually increases at the curve entrance toward a curved road where the lane curvature becomes constant. For this reason, the control permission range Wp is set to the widest first permission range Wa1 in step S25. As a result, when passing through the curve entrance, steering intervention by lane departure prevention control is executed before the lateral acceleration or lateral speed gradually increases, and so it is possible to obtain stable traveling performance.

Next, the flow proceeds to step S15 where a steering increase jerk is set based on the target lateral position. Although the target lateral position is assumed to be the departure determination lateral position in the present embodiment, the target lateral position may also be set more inside. Since the vehicle may depart from the departure determination lateral position when the vehicle travels on a predicted travel path based on a steering increase jerk ja (see FIG. 10) of the control pattern as indicated by a solid line in FIG. 9, it is necessary to make a correction to increase the lateral acceleration as a steering increase jerk ja' of the control pattern, control the predicted travel path so that the own vehicle M becomes parallel to the lane markers in front of the departure determination lateral position as indicated by a broken line in FIG. 9 and avoid departure.

There are various ways of setting the steering increase jerk ja' and, for example, it may be possible to search for and set an optimum steering increase jerk ja' at which the predicted travel path does not cross the departure determination lateral position using a binary search method based on a basic steering increase jerk ja, which is set in advance in the control pattern (see FIG. 10).

Next, the flow proceeds to step S16 where the term of the lateral moving amount at the time of increasing steering in aforementioned equation (1) is corrected with this steering increase jerk ja' and a new predicted lateral moving amount is calculated. As a result, the steering is increased over an elapsed time T0 to T1' by correcting the lateral moving amount at the time of increasing the steering as indicated by the broken line in FIG. 9, and so departure from the departure determination lateral position is avoided when the own vehicle M becomes parallel to the lane markers (elapsed time T3).

The flow proceeds to step S17 where a steering angle for causing the own vehicle M to travel along the corrected predicted travel path is calculated based on the corrected predicted lateral moving amount, the flow proceeds to step S18 where the corresponding steering angle signal is transmitted to the steering torque calculator 11d and the routine exits.

The steering torque calculator 11d calculates steering torque corresponding to the steering angle calculated by the departure prevention control calculator 11c and transmits a drive signal thereof to the EPS_ECU 8. The EPS_ECU 8 generates assist torque to prevent departure of the own vehicle M from the lane markers for the EPS motor 7 based on the steering torque transmitted from the LDP_ECU 11.

Figure 15:
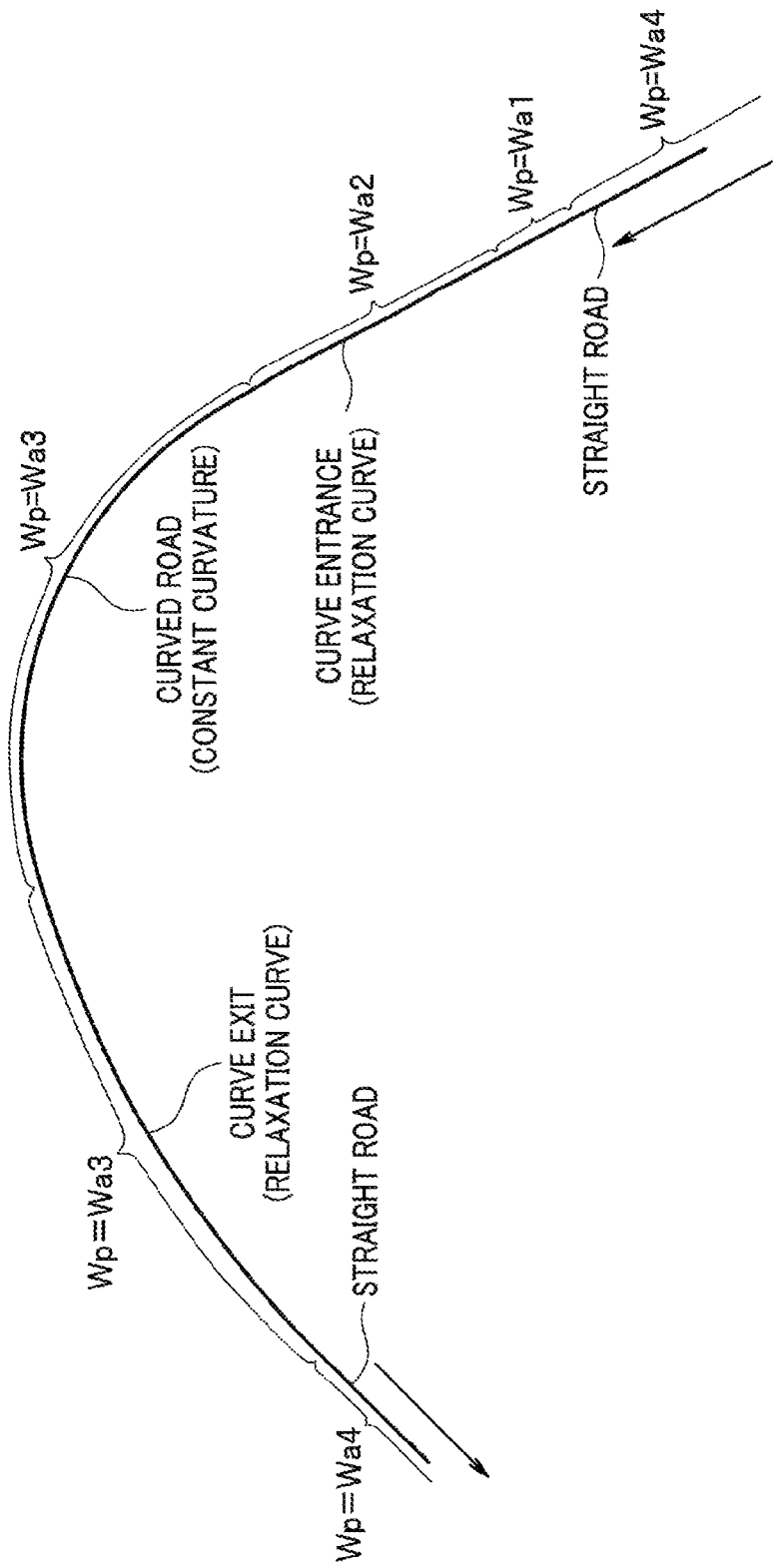
FIG. 15 is an explanatory diagram illustrating transition within a control permission range from a curve entrance to a curve exit.

Here, FIG. 15 illustrates transition of the control permission range Wp set by the LDP_ECU 11 when the own vehicle M enters the entrance of a curved road whose curvature gradually increases from a straight road, passes through a curved road with a constant curvature and exits to a straight road at an exit of a curved road whose curvature gradually decreases.

During traveling on the straight road, the lane curvature does not change, and the lane shape evaluation flag Fϕ is cleared (Fϕ=0). Moreover, since the straight road continues, the control permission range Wp is set to the fourth permission range Wa4 having the narrowest permission range (Wp←Wa4) in step S28 in FIG. 6.

Next, when the own vehicle M enters the entrance of the curved road, since the lane curvature gradually increases, the lane shape evaluation flag Fϕ is set (Fϕ=1), and since this is the moment immediately after the traveling road has been switched from a straight line to a curved line, the control permission range Wp is set to the first permission range Wa1 having the widest permission range (Wp←Wa1) in step S25.

The straight road and the curved road having constant curvature are connected via a relaxation curve such as a clothoid curve. Therefore, until the vehicle reaches the curved road having constant curvature, since the curvature of the curved road gradually increases, the control permission range Wp is set to the second permission range Wa2 (Wp←Wa2) in step S26.

When the vehicle reaches the curved road having constant curvature, the lane curvature becomes constant, and the lane shape evaluation flag Fϕ is cleared (Fϕ=0). Moreover, since the curved road continues, the control permission range Wp is set to the third permission range Wa3 (Wp←Wa3) in step S27 in FIG. 6.

After that, when the own vehicle M passes through the exit of the curved road, the exit of the curved road is designed so that the road curvature gradually decreases until the vehicle reaches the straight road along a relaxation curve. Therefore, the lane shape evaluation flag Fϕ is cleared (Fϕ=0), the lane curvature gradually decreases, and the control permission range Wp is thereby continuously set to the third permission range Wa3 (Wp←Wa3).

Immediately after the vehicle exits to a straight road at the exit of the curved road, the control permission range Wp is set to the fourth permission range Wa4 (Wp←Wa4) in step S28 in FIG. 6.

In addition to the aforementioned microcomputer, the EPS_ECU 8 and LDP_ECU 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the EPS_ECU 8 and the LDP_ECU 11 including the lateral position calculator 11a, the departure determination calculator 11b, the departure prevention control calculator 11c and the steering torque calculator 11d. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

Thus, according to the present embodiment, the control permission range Wp for permitting intervention of lane departure prevention control is variably set based on a change in the shape of the detected lane using the detected left and right lane markers as references. That is, the control permission range Wp is set according to the shape of a road on which the own vehicle M is traveling, to a narrower range for a straight road or to a wider range when the vehicle enters an entrance of a curved road from a straight road. It is thereby possible to prevent unnecessary intervention of lane departure prevention control on a straight road or permit early intervention of departure prevention control when the vehicle enters the entrance of the curved road from the straight road, thus achieving stable traveling control. As a result, it is possible to start lane departure prevention control at optimum timing depending on the lane shape.

Note that the technology is not limited to the aforementioned embodiment, but, for example, the lateral width of the second permission range Wa2 for setting the left and right control permission ranges Wp may be set so as to overlap at the center of the lane.

The invention claimed is:

1. A lane departure prevention control apparatus for a vehicle, the lane departure prevention control apparatus comprising:
   a traveling environment recognizer configured to i) recognize a traveling environment ahead of the vehicle, and ii) detect a lane marker that marks one of two sides of a traveling lane in which the vehicle is traveling based on the recognized traveling environment;
   a control permission range setting unit configured to set a control permission range extending from the lane marker toward a lane center of the traveling lane, wherein the control permission range indicates a range in which execution of departure prevention control is permitted, wherein the execution of departure prevention control is permitted when a reference point of the vehicle enters the control permission range, and wherein the reference point is set at a predetermined location of a vehicle body of the vehicle;
   a vehicle behavior detector configured to detect behavior of the vehicle;

a predicted departure determiner configured to i) predict a travel path of the reference point based on the detected behavior and ii) determine whether the predicted travel path of the reference point crosses a line based on the detected lane marker and the predicted travel path of the reference point, wherein the line is set at a predetermined distance from the lane marker to the lane center and set within the control permission range;

a steering torque calculator configured to, in response to determining that i) the reference point enters the control permission range extending from the lane marker toward the lane center of the traveling lane and ii) the predicted travel path of the reference point crosses the line, transmit a drive signal corresponding to steering torque to a steering controller to execute the departure prevention control for preventing departure of the vehicle from the lane marker and configured to, in response to determining that i) the reference point does not enter the control permission range extending from the lane marker toward the lane center of the traveling lane and ii) the predicted travel path of the reference point crosses the line, not to transmit the drive signal corresponding to the steering torque to the steering controller to execute the departure prevention control; and a lane shape detector configured to detect a change in a lane curvature of the traveling lane, wherein, when the detected change in the lane curvature is in a direction in which the lane curvature decreases or the lane curvature is constant, the control permission range setting unit sets a width of the control permission range that extends from the lane marker toward the lane center of the traveling lane to be narrower than a half width of the traveling lane, and wherein, when the detected change in the lane curvature is in a direction in which the lane curvature increases, the control permission range setting unit sets the width of the control permission range that extends from the lane marker toward the lane center of the traveling lane to be equal to or wider than the half width of the traveling lane.

2. The vehicle lane departure prevention control apparatus according to claim 1,
wherein the reference point is set at a center of the vehicle body in a vehicle width direction, and
wherein the line is set at a distance of the half width of the vehicle body from the lane marker to the lane center.

3. The vehicle lane departure prevention control apparatus according to claim 1, wherein
the vehicle behavior detector comprises a plurality of vehicle behavior detectors, and
the lane shape detector evaluates the change in the lane curvature by selecting two or more of curvature along the traveling lane and behavior in a lateral direction acting on the vehicle detected by each vehicle behavior detector.

4. The vehicle lane departure prevention control apparatus according to claim 1, wherein the lane shape detector detects the change in the lane curvature based on the lane marker detected by the traveling environment recognizer and behavior in a lateral direction acting on the vehicle detected by the vehicle behavior detector.

5. A lane departure prevention control apparatus for a vehicle, the lane departure prevention control apparatus comprising:
circuitry configured to:
recognize a traveling environment ahead of the vehicle;
detect a lane marker that marks one of two sides of a traveling lane in which the vehicle is traveling based on the recognized traveling environment;
set a control permission range extending from the lane marker toward a lane center of the traveling lane, wherein the control permission range indicates a range in which execution of departure prevention control is permitted, wherein the execution of departure prevention control is permitted when a reference point of the vehicle enters the control permission range, and wherein the reference point is set at a predetermined location of a vehicle body of the vehicle;
detect behavior of the vehicle;
predict a travel path of the reference point based on the detected behavior;
determine whether the predicted travel path of the reference point crosses a line based on the detected lane marker and the predicted travel path of the reference point, wherein the line is set at a predetermined distance from the lane marker to the lane center and set within he control permission range;
in response to determining that i) the reference point enters the control permission range extending from the lane marker toward the lane center of the traveling lane and ii) the predicted travel path of the reference point crosses the line, transmit a drive signal corresponding to steering torque to a steering controller to execute the departure prevention control for preventing departure of the vehicle from the lane marker;
in response to determining that i) the reference point does not enter the control permission range extending from the lane marker toward the lane center of the traveling lane and ii) the predicted travel path of the reference point crosses the line, not to transmit the drive signal corresponding to the steering torque to the steering controller to execute the departure prevention control; and
detect a change in a lane curvature of the traveling lane in which the vehicle is traveling,
wherein, when the detected change in the lane curvature is in a direction in which the lane curvature decreases or the lane curvature is constant, the circuitry is configured to set a width of the control permission range that extends from the lane marker toward the lane center of the traveling lane to be narrower than a half width of the traveling lane, and
wherein, when the detected change in the lane curvature is in a direction in which the lane curvature increases, the circuitry is configured to set the width of the control permission range that extends from the lane marker toward the lane center of the traveling lane to be equal to or wider than the half width of the traveling lane.

6. The vehicle lane departure prevention control apparatus according to claim 5,
wherein the reference point is set at a center of the vehicle body in a vehicle width direction, and
wherein the line is set at a distance of the half width of the vehicle body from the lane marker to the lane center.

7. A lane departure prevention control apparatus for a vehicle, the lane departure prevention control apparatus comprising circuitry configured to:
recognize a traveling environment ahead of the vehicle and detect a lane marker of a traveling lane in which the vehicle is traveling based on the recognized traveling environment;

detect behavior of the vehicle;
predict a travel path of a reference point of the vehicle based on the detected behavior, the reference point being set at a predetermined location of a vehicle body of the vehicle;
determine whether the predicted travel path of the reference point crosses a line based on the detected lane marker and the predicted travel path of the reference point, the line being set at a predetermined distance from the lane marker to a lane center of the traveling lane;
set a control permission range such that the control permission range extends from the lane marker toward the lane center of the traveling lane, the control permission range indicating a range in which execution of departure prevention control is permitted, a width of the control permission range being greater than the predetermined distance;
in response to determining that i) the reference point enters the control permission range extending from the lane marker toward the lane center of the traveling lane and ii) the predicted travel path of the reference point crosses the line, transmit a drive signal corresponding to steering torque to execute the departure prevention control for preventing departure of the vehicle from the traveling lane to a steering controller; and
in response to determining that i) the reference point does not enter the control permission range extending from the lane marker toward the lane center of the traveling lane and ii) the predicted travel path of the reference point crosses the line, not to transmit the drive signal corresponding to the steering torque to execute the departure prevention control to the steering controller,
wherein the circuitry is further configured to
detect a curvature of the traveling lane each time a predetermined time is elapsed,
compare a first curvature and a second curvature, the first curvature is the latest detected curvature of the traveling lane and the second curvature is a curvature of the traveling lane detected the predetermined time before the first curvature,
when the first curvature is larger than the second curvature, set the width of the control permission range to be equal to or wider than a half width of the traveling lane, and
when the first curvature is equal to or smaller than the second curvature, set the width of the control permission range to be narrower than the half width of the traveling lane.

8. The vehicle lane departure prevention control apparatus according to claim 7,
wherein the reference point is set at a center of the vehicle body in a vehicle width direction, and
wherein the line is set at a distance of the half width of the vehicle body from the lane marker to the lane center.

9. The vehicle lane departure prevention control apparatus according to claim 7, wherein the circuitry is further configured to
determine whether a shape of the traveling lane was a straight road at a time that the second curvature was detected,
when i) the first curvature is equal to or smaller than the second curvature and ii) the shape of the traveling lane at the time that the second curvature was detected is not the straight road, set the width of the control permission range to a third width, the third width is narrower than the half width of the traveling lane, and
when i) the first curvature is equal to or smaller than the second curvature and ii) the shape of the traveling lane at the time that the second curvature was detected is the straight road, set the width of the control permission range to a fourth width, the fourth width is narrower than the third width.

10. The vehicle lane departure prevention control apparatus according to claim 7, wherein the circuitry is further configured to
determine whether a shape of the traveling lane is a straight road at a time that the second curvature was detected,
when i) the first curvature is larger than the second curvature and ii) the shape of the traveling lane at the time that the second curvature was detected is the straight road, set the width of the control permission range to a first width, the first width is wider than the half width of the traveling lane, and
when i) the first curvature is larger than the second curvature and ii) the shape of the traveling lane at the time that the second curvature was detected is not the straight road, set the width of the control permission range to a second width, the second width is equal to the half width of the traveling lane.

11. The vehicle lane departure prevention control apparatus according to claim 10, wherein the circuitry is further configured to
when i) the first curvature is equal to or smaller than the second curvature and ii) the shape of the traveling lane at the time that the second curvature was detected is not the straight road, set the width of the control permission range to a third width, the third width is narrower than the second width, and
when i) the first curvature is equal to or smaller than the second curvature and ii) the shape of the traveling lane at the time that the second curvature was detected is the straight road, set the width of the control permission range to a fourth width, the fourth width is narrower than the third width.

* * * * *